United States Patent [19]

Ladouceur

[11] Patent Number: 5,667,281
[45] Date of Patent: Sep. 16, 1997

[54] WHEEL COVER ASSEMBLY

[75] Inventor: Lawrence C. Ladouceur, Windsor, Canada

[73] Assignee: Textron Automotive Company Inc., Troy, Mich.

[21] Appl. No.: 641,166

[22] Filed: Apr. 29, 1996

[51] Int. Cl.[6] ............................................. B60B 7/14
[52] U.S. Cl. ............................. 301/37.37; 301/37.1
[58] Field of Search ............................ 301/37.1, 37.37, 301/108.1, 108.4

[56] References Cited

U.S. PATENT DOCUMENTS

| | | | |
|---|---|---|---|
| 4,998,780 | 3/1991 | Eshler et al. | 301/37.37 |
| 5,163,739 | 11/1992 | Stanlake | 301/37.37 |
| 5,249,845 | 10/1993 | Dubost | 301/37.37 |
| 5,520,445 | 5/1996 | Toth | 301/108.4 X |

*Primary Examiner*—Russell D. Stormer
*Attorney, Agent, or Firm*—Reising, Ethington, Barnard & Perry

[57] ABSTRACT

A wheel cover is formed with a plurality of circumferentially spaced openings corresponding in number and arrangement to the wheel studs of a vehicle wheel. A decorative cap member is provided in each opening for threaded engagement with external screw threads of the vehicle's lug nuts to secure the wheel cover on the wheel. A retainer member is mounted on the inner end of each cap member presenting a radially outwardly extending shoulder that prevents the cap members from being separated from the wheel cover once installed. The retainer members further act between the cap members and their lug nuts in such manner as to hold the cap members securely but releasably against unthreading from the lug nuts during normal use.

6 Claims, 2 Drawing Sheets

WHEEL COVER ASSEMBLY

This invention relates to wheel covers for automotive vehicles and, more particularly, to wheel covers having decorative caps that thread into engagement with externally threaded lug nuts of the wheel.

BACKGROUND OF THE INVENTION

Various wheel cover retention systems are known for retaining a plastic wheel cover to the wheel of a vehicle. One type employs a plurality of decorative caps which are carried by the wheel cover and thread into engagement with externally threaded lug nuts of the wheel to secure the wheel cover in place on the wheel. U.S. Pat. No. 4,998,780 ('780) discloses such a wheel cover retention system. The caps are formed with retaining legs that extend from an open end of the caps and terminate at barbed ends which extend through openings in the wheel cover to lock the caps on the wheel cover. The caps are threaded onto the wheel's lug nuts bringing a mounting shoulder of the cap members to bear against recessed flanges of the cap member, forcing the center of the cover inwardly and urging the perimeter of the wheel cover against the rim of the wheel. In effort to prevent the caps from unthreading from the lug nuts during use, a series of interlocking ribs is provided at the interface between the engaging surfaces of the caps and cover. In spite of the ribs, the caps may loosen if not fully tightened to begin with or conditions change lessening the compression force at the engaging cap and cover member surfaces, such as temperature changes or excessive vibrations.

SUMMARY OF THE INVENTION AND ADVANTAGES

According to the invention, a wheel cover assembly for covering the wheel of an automotive vehicle is provided comprising a decorative cover member having a plurality of openings to receive exteriorly threaded lug nuts of the wheel and mounting flanges surrounding the openings. A cap member is provided in each opening having an axially inner end open to receive an associated one of the lug nuts threadably therein, an opposite axially outer end that is closed, and an outer annular mounting shoulder confronting an axially outer surface of the mounting flanges of the cover member when the lug nuts are fully received within the cap members, to secure the cover member to the wheel of the vehicle. Each cap member has a retainer member mounted adjacent its inner end providing a retaining shoulder projecting radially outwardly of the cap member in axially spaced relation to the mounting shoulder of the cap member to permit axial and rotational movement of the cap members within the opening relative to the cover member, while preventing separation of the cap members from the cover member when the cap members are detached from the lug nuts by engagement of the retaining shoulder with an axially inner surface of the cover member. The retainer member further includes an anti-removal portion acting between the cap members and their respective lug nuts when in their fully received position within the cap members to releasably secure the cap members against reverse rotation and hence inadvertent removal from the lug nuts.

The anti-removal portion of the retaining member acts independently of the compression force applied at the mating surfaces of the cap members and the cover member. In this way, unlike the interlocking ribs between the mating surfaces of the cap and cover of the '780 device, the retainer member of the present invention releasably secures the cap members against reverse rotation even if the outward force exerted by the cover changes over time so as to lessen the clamping force between the cap member and cover member.

According to a particular embodiment, the retaining member comprises a metal snap ring that is mounted about the inner end of the cap member and extends radially to provide the retaining shoulder. The snap ring exerts a continuous inward radial force on the inner end of the cap member which is slotted causing it to flex inwardly around a tapered nose of the lug nut to secure the cap member from inadvertent removal.

In another preferred embodiment, the retaining member comprises a metal spring washer having an annular body portion formed with a plurality of directional mounting tabs that extend inwardly of the body allowing the washer to be slid over the first end of the cap member and then secured against removal by engagement of the mounting tabs with a cap member. The body of the retainer projects radially outwardly of the cap member to provide the retaining shoulder. Another plurality of anti-rotation tabs extend radially inwardly of the cap member through associated openings in the cap member for frictional engagement with the external threads of the lug nut, thereby imparting frictional resistance to removal of the cap member.

In still another preferred embodiment, the retaining member comprises a ductile metal component having a threaded sleeve portion secured within the cap member to provide internal metal screw threads within the cap member for threaded frictional engagement with the external threads of the lug nut to prevent inadvertent removal of the cap member. A plurality of tab portions extend outwardly of the cap member through slotted openings in the inner end to provide the retaining shoulders of the retainer.

Thus, in each embodiment of the invention, the retainer member interacts with the cap member and lug nut to introduce a frictional force between the cap member and lug nut acting to prevent inadvertent unthreading of the cap members from the lug nuts.

THE DRAWINGS

Presently preferred embodiments of the invention are disclosed in the following description and in the accompanying drawings, wherein.

DETAILED DESCRIPTION

Figure 2:
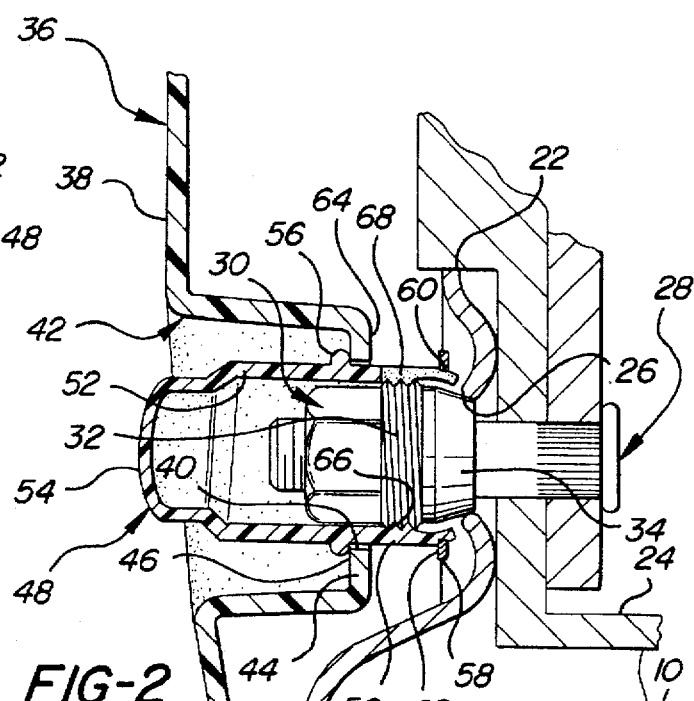
FIG. 2 is a fragmentary cross-sectional view of a wheel cover assembly of the present invention shown mounted on a wheel of an automotive vehicle with a cap member and retainer assembly shown sectioned generally along line 2—2 of FIG. 3.

A conventional wheel of an automotive vehicle is designated generally at 10 in FIG. 2 and includes a center disc portion 12 and an outer rim portion 14 having a tire bead flange 16 for engaging a sidewall 18 of a conventional automotive tire 20 for mounting the tire on the wheel 10.

The disc portion 12 of the wheel 10 includes a central hub-receiving opening 22 to receive a hub 24 of the vehicle and a plurality of circumferentially spaced wheel stud-receiving openings 26 arranged about the central opening 22 to receive correspondingly arranged lug studs 28 of the vehicle. Threaded onto each stud 28 is a lug nut 30 to secure the wheel 10 to the axial hub of the vehicle in conventional manner. Each of the lug nuts 30 includes an externally threaded portion 32 and a tapered nose 34 adjacent the threads 32. The tapered nose 34 of each lug nut engages the disc portion 12 around the openings 26 when the lug nut 32 is fully threaded onto its respective wheel stud 28. The wheel mounting arrangement described above is conventional for mounting the wheel on the axial hub of a vehicle.

A center-mounted wheel cover assembly 36 comprises a disc-like cover member 38 injection molded from suitable plastics material and formed with a plurality of circumferentially spaced apertures 40, corresponding in arrangement to the wheel stud openings 26 of the wheel 10 to receive the corresponding lug studs 28 and an outer hex portion of the lug nuts 30 extendibly through each aperture 40. The cover member 38 can be made from metal and can be formed by processes including press forming, casting or the like.

According to the preferred embodiment, the cover member 38 is formed with axially inwardly extending recesses or wells 42 having bottom walls 44 in which the apertures 40 are formed defining an annular lip or mounting flange 46 surrounding each aperture 40. Accommodated in each well 42 is a decorative cap member 48, illustratively shown as plastic, for covering the lug nuts 30 and mounting the wheel cover 38 to the wheel 10.

The cap member 48 can be made of any suitable plastic, metal or other materials having adequate physical properties for the purposes to be described herein. The cap members 48 include axially directed inner first end portions 50 projecting through the associated apertures 40 inwardly beyond the mounting flanges 46 of the wheel cover 38. Each inner end 50 is open to receive an associated one of the lug nuts 30 threadably into the cap member 48, as illustrated in FIG. 2. An axially directed, hexagonally shaped outer portion 52 extends axially outwardly of the mounting flange 46 and is closed at an end wall 54 thereof. An outer annular flange or mounting shoulder 56 is formed between the inner and outer portions 50, 52 of each cap member and projects radially outwardly of the apertures 40.

The cap members 48 are assembled to the cover member 38 by extending the inner end portion 50 through the apertures 40 until the mounting shoulders 56 abut the mounting flanges 46 of the cover member 38. A retainer member 58 is then mounted on each cap member 48 adjacent its inner open end 52. According to the first embodiment of FIGS. 2 and 3, the retainer member 58 comprises a metal snap ring that is fitted in an annular groove 60 of each cap member 48 adjacent its inner open end 50. The snap rings 58 project radially outwardly of the cap members 48, presenting an upper retaining shoulder 62 that is spaced axially from the mounting shoulders 56 of each cap member 48 to capture the cap members 48 within their apertures 40, preventing the cap members 48 from being inadvertently separated from the cover member 38 when not attached to the lug nuts 30. The inner end portions 50 are relatively smaller in diameter than the openings 40, permitting both axial and rotational movement of the caps 48 relative to the cover member 38. Any attempt to separate the decorative caps 48 from the wheel cover 38 is thus prevented by engagement of the shoulder 62 of each of the retaining members 58 with the axially inner side 64 of the mounting flanges 46 of the cover 38.

Once the cap members 48 have been assembled with the cover member 38, the wheel cover 38 is mounted to the wheel 10 by positioning the cover 38 in overlying relation to the center disc portion 12 and the rim portion 14 of the wheel and then guiding the open ends 50 of the cap members 48 over the lug nuts 30 so as to receive the lug nuts into the cap members. The cap members 48 are then rotated to cause an internal thread section 66 of the cap members 48 to engage the external threads 32 of the lug nuts 30, bringing the perimeter of the cover member 38 to bear against the rim portion 14 of the wheel and forcing the mounting shoulder 56 of the caps 48 to bear against the axially outer surface of the mounting flange 46 of the wheel cover 38. While the outer edge 38a of the cover member is shown in engagement with the tire bead flange 16, it will be understood by those skilled in the art that the holding action of the cap member 48 and retainer 58 assemblies are suitable for use with any wheel cover and wheel rim configurations, e.g., including one in which an air space is provided between the outer edge 38a and the wheel rim.

Figure 1:
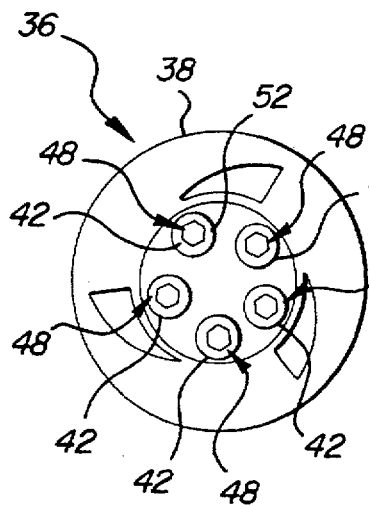
FIG. 1 is a diagrammatic plan view of a wheel cover assembly constructed in accordance with the present invention.
Figure 3:
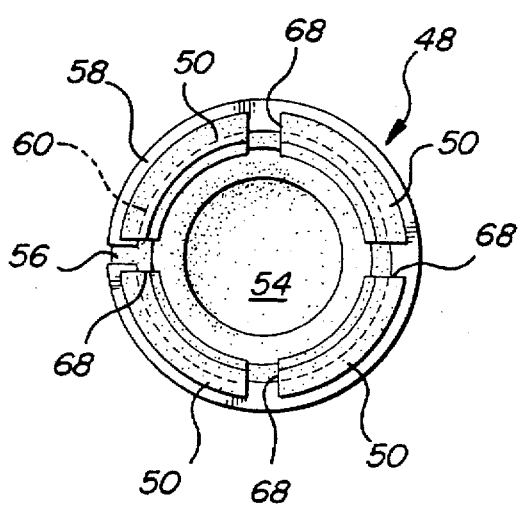
FIG. 3 is an end view of the cap member and retainer assembly of FIG. 2.

As illustrated in FIGS. 2 and 3, the inner end portion 50 of the cap members 48 are formed with at least one, and preferably a plurality, of axial slots 68 which render the inner end 50 resiliently flexible radially inwardly of the cap member 48. The snap ring 58 preferably has a diameter in its unstressed condition that is relatively smaller than that of the base of the groove 60, so as to define an anti-rotation portion on the retainer member or snap ring 58 that exerts a continuous radially inwardly clamping or pinching force on the inner end 50 of the cap members urging them radially inwardly toward the lug nuts 30, so as to squeeze the threaded section 66 of the cap members 48 inwardly against the external threads 32, of the lug nuts 30 and introducing frictional resistance to the unthreading of the cap member 48 from the lug nuts 30. This anti-rotation portion and resultant effect of the snap ring 58 is enhanced by locating the snap ring 58 preferably beyond the external threads 32 of the lug nuts 30 adjacent the tapered nose 34, as illustrated in FIG. 2. For this purpose, the inner ends 50 of the cap members 48 extend axially beyond the threaded section 32 of the lug nuts 30 and at least partially over the tapered nose 34 enabling the snap ring 58 to wrap draw the inner ends 50 about the nose 34 of the lug nuts and inwardly of the threaded section 32 of the lug nuts 30, effectively locking the cap members 48 releasably on their respective lug nuts 30. It will be appreciated that the locking action of the retainer member 58 occurs as a result of its interaction between the cap members 48 and lug nuts 30, and is independent of the compression force exerted at the mating surfaces of the cap members 48 and the cover member 38.

To remove the mounted wheel cover 38 from the wheel 10, one simply unthreads the cap members 48 from the lug nuts 30 by applying an unthreading force sufficient to enable the inner end 50 of the cap members 48 to expand outwardly against the force of the snap ring 58 over the threads 32 and out of threaded engagement with the lug nuts 30.

Figure 4:
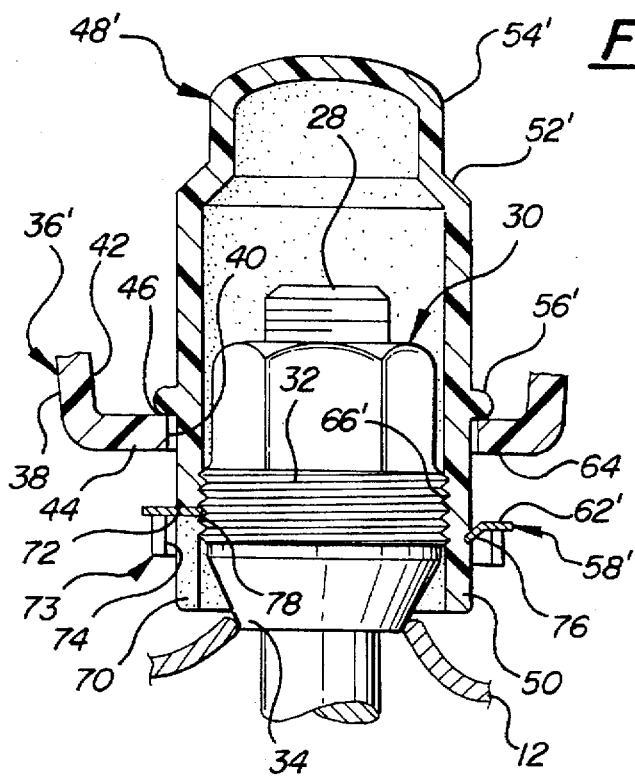
FIG. 4 is an enlarged fragmentary cross-sectional view of another embodiment of the invention including a cap member and retainer assembly.
Figure 5:
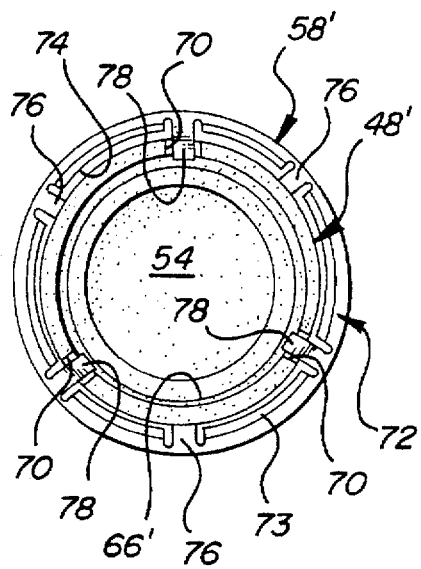
FIG. 5 is an end view of the cap member and retainer assembly of FIG. 4.

FIGS. 4 and 5 illustrate another embodiment of the invention wherein primed reference numerals are used to indicate correspondingly like features. According to the second embodiment, a plastic cap member 48' is provided having the same general features as that of the cap member 48 of the first embodiment, including inner 50' and outer 52' end portions, a mounting shoulder 56', and an inner threaded section 66'. The inner end portion 50' is formed with a plurality of circumferentially spaced slotted openings 70 extending axially from the open end portion 50 to the threaded section 66' thereof. The openings 70 provide access into the cap member 48' from the side.

The retaining member 58' of the second embodiment comprises a metal spring washer having a generally planer body portion 72 with an annular lip 73 defining a central opening 74. The body portion 72 has a first plurality of circumferentially spaced directional mounting tabs or barbs 76. The tabs 76 extend radially inwardly into the opening 74 and are bent slightly out of the plane of the body 72 having free ends thereof that lie along a diameter slightly smaller than that of the inner end portion 50' of the cap member 48' when in an unstressed condition. The retaining member 58' further includes a second plurality of anti-rotation portions or tab projections 78 that project radially inwardly into the opening 74 by a distance greater than that of the mounting tabs 76 such that the free ends of the anti-rotation tabs 78 lie along a diameter relatively smaller than that of the mounting tabs 76, and approximating the inner diameter of the threaded region 66' of the cap member 48'.

The cap member 48' is assembled with the wheel cover 38 by extending the inner end portion 50' into the recess 42 and through the lug opening 40 thereof, in the same manner as the first embodiment, until the mounting shoulder 56' confronts the mounting flange 46 of the wheel cover 48. The retainer member 58' is then mounted on the cap member 48' by aligning the anti-rotation tabs 78 with the slotted openings 70 of the cap member 48' and then forcing the retainer 58' axially over the inner end 50', wherein the anti-rotation tabs 78 are guided along the slotted openings 70 and the mounting tabs 76 are caused to deflect further out of the plane of the spring washer to the position illustrated in FIG. 4. When fully assembled, the anti-rotation tabs 78 are bottomed out in the slotted openings 70 and the free ends of the anti-rotation tabs 78 extend a small distance into the cap member beyond an inner wall thereof.

As illustrated in FIGS. 4 and 5, the annular body 72 of the spring washer projects radially outwardly of the cap member 48' and beyond the lug openings 40 of the wheel cover 38 presenting an axially outwardly facing surface that serves as the retaining shoulder 62' of the retainer member 58'. Any attempt to withdraw the cap member 48' out of the opening 40 of the wheel cover is prevented by engagement of the retaining shoulder 62' with the axially inner side 64 of the mounting flange 46, in the same manner as the retaining shoulder 62 of the first embodiment. The directional mounting tabs 76 bite into and securely hold the retainer member 58' in position on the cap member 48' once installed. In this way, the cap member 48' is able to move both axially and rotatably relative to the cover member in the same manner as the cap member 48 of the first embodiment. The wheel cover assembly 36' is mounted on the wheel 10 in similar fashion by threading the cap members 48' onto the lug nuts 30 to urge the mounting shoulder 56' of the cap members 48' into engagement with the mounting flange 46 of the wheel cover. As illustrated best in FIG. 4, the retaining members 58' act between the cap members 48' and the lug nuts 30 to prevent reverse rotation of the cap members 48' by extending the anti-rotation tabs 78 into metal-to-metal contact with the threads 32 of the lug nuts. The metal-to-metal contact introduces frictional resistance to the rotation of the cap members 48' relative to the lug nuts 30 sufficient to prevent the cap members 48' from unthreading from their lug nuts 30 during normal operation of the vehicle.

Figure 6:
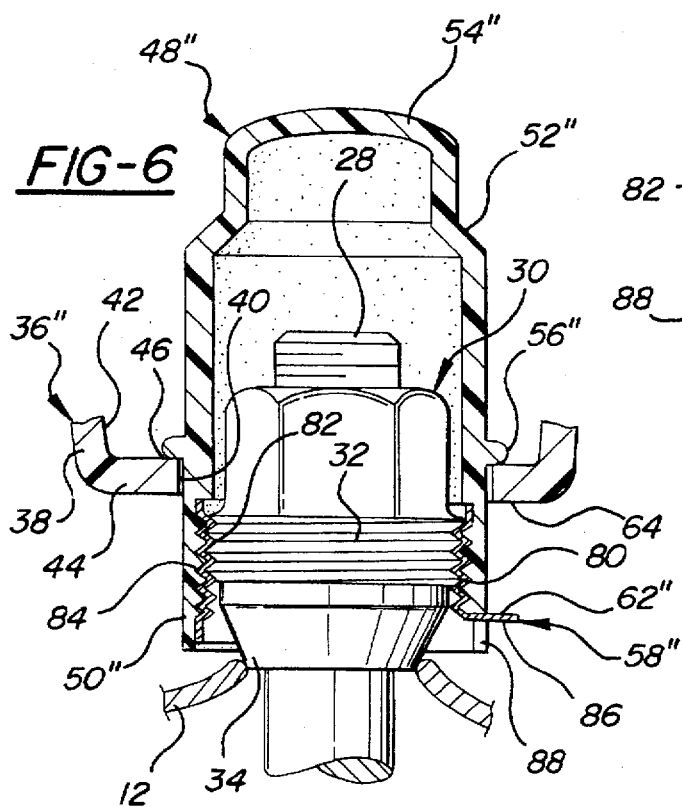
FIG. 6 is an enlarged fragmentary sectional view of another embodiment of the invention.
Figure 7:
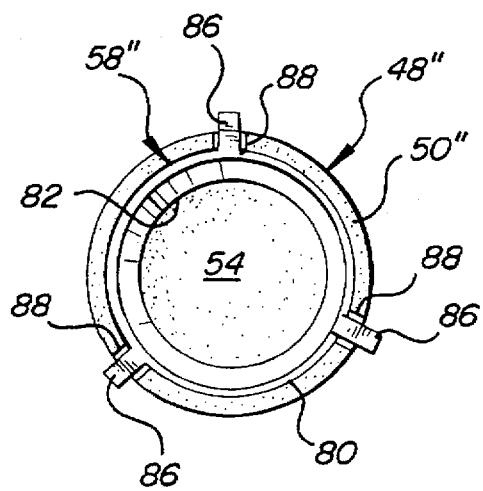
FIG. 7 is an end view of the cap member and retainer assembly of FIG. 6.

FIGS. 6 and 7 illustrate still another embodiment of the wheel cover assembly 36" wherein the plastic cap members 48" are similarly formed to include axially inner and outer end portions 50", 52" and an integral mounting shoulder 56" for engaging the mounting flange 46 of the wheel cover 38.

In this embodiment, the retainer member 58" comprises a ductile metal component having a threaded sleeve section 80 that is disposed within the open inner end 50" of the cap member 48" to provide internal metal screw threads 82 within the cap member 48". The retainer 58" may be secured in place within the cap member 48" by means of a layer of adhesive 84 or any other equivalent locking device such as mechanical fasteners, interposed friction members or the like. As illustrated best in FIG. 7, the retainer 58" is formed with a plurality of circumferentially spaced tab portions 86 that, after the sleeve section 80 has been installed in the cap member 48", are bent from their initial axial position illustrated by broken lines in FIG. 6 to a radially outward position, shown by solid lines in FIGS. 6 and 7, through a corresponding plurality of slots 88 formed in the inner end 50" of the cap member 48" to provide the retaining shoulder 62" of the retaining member 58", which functions in the same manner as the retaining shoulders of the first two embodiments described above.

Mounting the wheel cover assembly 36" on the wheel 10 is carried out in the same general manner as that described above, wherein the cap members 48" are threaded into engagement with the lug nuts 30. In this embodiment, the screw threads 82 are dimensioned to define an anti-rotation portion on the retainer 58" such that surface-to-surface contact between the screw threads 82 of the sleeves 80 and those of the lug nuts 30 act between the lug nut 30 and cap member 48" in such manner as to introduce frictional resistance to prevent reverse rotation of the cap member 48", during use, so as to hold the cap member 48" securely, during use, against reverse rotation relative to the lug nut 30 due to normal operation of the vehicle. However, the frictional resistance is releasable by applying a release torque on the cap members 48" for unthreading them from the lug nuts 30 to remove the wheel cover.

Accordingly, the disclosed embodiments are representative of presently preferred forms of the invention, and are intended to be illustrative rather than definitive thereof. The invention is defined in the claims.

We claim:

1. A wheel cover assembly for covering the wheel of an automotive vehicle, comprising:

a decorative cover member having a plurality of openings to receive exteriorly threaded lug nuts of the wheel and mounting flanges with an axially inner surface on said cover member surrounding said openings;

a cap member provided in each of said openings having an axially inner end open to receive an associated one of the lug nuts threadably into the cap member by a forward rotation of said cap relative to said lug nut, an opposite axially outer end that is closed, and a mounting shoulder; and a retainer member mounted on each of said cap members adjacent said axially inner end thereof having a retaining shoulder projecting radially outwardly of each of said cap members in axially spaced relation to said mounting shoulder of said cap members permitting both axial and rotational movement of each of said cap members relative to said cover member while preventing separation of said cap members from said cover member by engagement of said retaining shoulder with said axially inner surface of said cover member, and an anti-removal portion on said retainer member acting between said cap members and their respective lug nuts to releasably secure said cap members against reverse rotation relative to the lug nuts.

2. The assembly of claim 1 wherein said cap members each have an internal threaded section for engaging the external threads of the lug nuts and said inner ends include at least one slot enabling said inner ends to flex radially of said cap members, and said anti-removal portion of said retainer members comprising a snap ring carried about said inner ends and acting constantly to urge said inner ends radially inwardly to resist reverse rotation of said cap members, said snap rings projecting radially outwardly of said cap members to define said retaining shoulders of said retaining members.

3. The assembly of claim 2 wherein the lug nuts have a tapered nose adjacent their external threads, said first end of said cap members being configured to extend at least partially over said nose when fully threaded onto the lug nuts such that said spring clips cause said first ends of said cap members to flex radially inwardly of said internal threaded section.

4. The assembly of claim 1 wherein said cap members each have an internal threaded section for engaging the external threads of the lug nuts, and said anti-removal portion of said retaining members comprises spring washers each having an annular body portion and a first plurality of directional mounting tabs extending inwardly of said body portion enabling said spring washers to be slid over said inner end of said cap members and thereafter engaging said cap members to resist reverse removal of said washers and supporting said body portions in radially outwardly extending relation to said cap members defining said retaining shoulders of said retaining members, and each of said washers including a second plurality of anti-rotation tabs extending inwardly of said body portion beyond said mounting tabs, said cap member including a plurality of associated openings through which said anti-rotation tabs extend when said washers are mounted on said cap members for frictional engagement with the external threads of the lug nut to resist reverse rotation of said cap members.

5. The assembly of claim 1 wherein said retaining member comprises a sleeve portion secured within each of said cap members said anti-rotation portion including internal threading dimensioned to provide internal screw threads within said cap members for threaded frictional engagement with the external threads of the lug nuts to resist disengagement of said cap members from the lug nuts, each said sleeve portion further including a plurality of radial tab portions projecting radially outwardly of said cap members to define said retaining shoulders of said retaining members.

6. The assembly of claim 5 wherein said cap members include a plurality of slots extending into said inner end, said tab portions extending through said slots.

* * * * *